Figure 1:
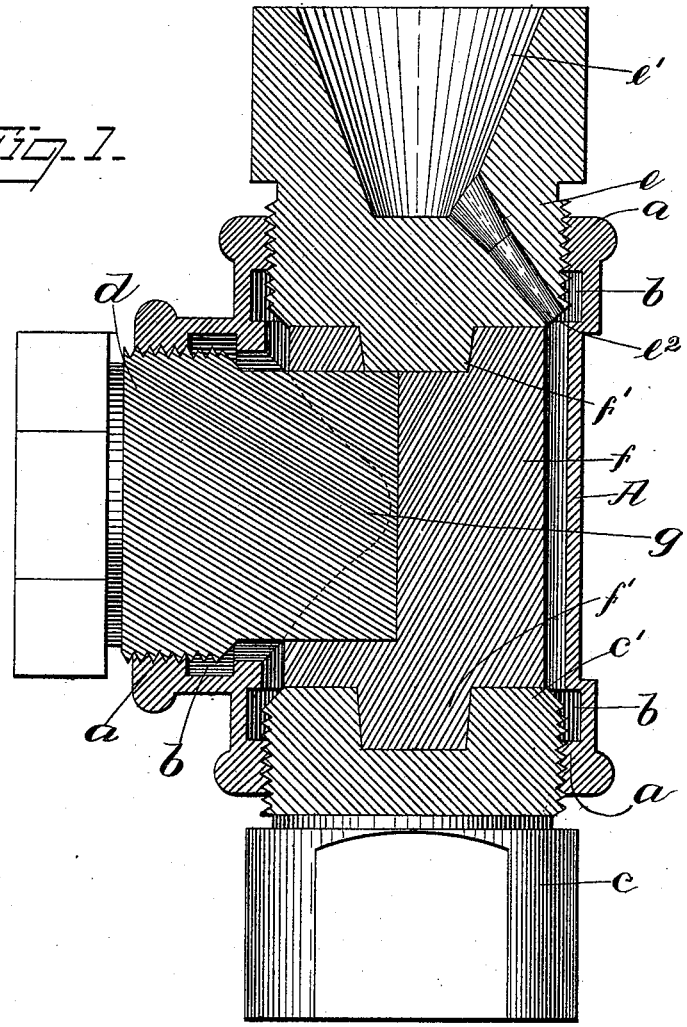

(No Model.)

G. W. HARRINGTON.
MOLD FOR LINING PIPE FITTINGS.

No. 536,342. Patented Mar. 26, 1895.

WITNESSES.
Charles B. Crocker.
L. B. Parker.

INVENTOR.
George W. Harrington
by B. J. Noyes,
Atty.

UNITED STATES PATENT OFFICE.

GEORGE W. HARRINGTON, OF WAKEFIELD, MASSACHUSETTS, ASSIGNOR TO THE NEW ENGLAND WATER PIPE COMPANY, OF SAME PLACE.

MOLD FOR LINING PIPE-FITTINGS.

SPECIFICATION forming part of Letters Patent No. 536,342, dated March 26, 1895.

Application filed August 2, 1894. Serial No. 519,267. (No model.)

*To all whom it may concern:*

Be it known that I, GEORGE W. HARRINGTON, of Wakefield, in the county of Middlesex and State of Massachusetts, have invented an Improvement in Molds for Lining Pipe-Fittings, of which the following description, in connection with the accompanying drawings, is a specification, like letters on the drawings representing like parts.

This invention has for its object to construct an apparatus or mold for casting or forming a lining upon the interior of any of the various forms of pipe fittings, such for instance as a T, or a union, or an elbow, or coupling.

The lining is or may be composed essentially of lead, or other non-corrosive material, but my invention is not limited to the use of any particular material of which the lining may be composed.

The fitting, when lined, comprises a cast iron shell having one or more internally screw threaded end portions for connecting it with another pipe or fitting, such screw threaded portions being formed at one end or both ends of the fitting, or as in a T-fitting at three different points, the outer ends of said screw threaded portions being cut or otherwise formed in the iron, and the inner ends thereof being formed in the material of the lining, that is to say, assuming that the lining is composed of lead, or material containing a large percentage of lead, the inner ends of the screw threaded portions will be composed of lead, and said lead threads will form a continuation of the iron threads, so that when the fitting is connected to or secured upon another pipe or fitting no iron is exposed to be brought in contact with the material passing or flowing through the pipe.

In accordance with this invention the fitting has at each opening an inwardly extending screw threaded flange or rib, and next to said flange an annular recess is preferably formed in the bore of the fitting, although said annular recesses may be omitted and the internal diameter of the fitting remain the same from end to end between the flanges. Externally screw threaded plugs are screwed into the fitting, the threaded portions of which are made to project inwardly beyond the flanges, and one of said plugs has a passage through it for the molten metal of which the lining is composed. Between the inner ends of the plugs one or more core pieces are placed, they being made smaller in diameter than the internal diameter of the fitting in order that an annular space may be formed around said core pieces, or between the core pieces and the shell, to receive the material of the lining. The molten metal is introduced through the passage formed in one of the plugs, and fills the annular space around the core piece or pieces, and also around the inner projecting ends of the threaded plugs, so that when the material is cooled, and the plugs and core piece or pieces withdrawn, a lining is formed covering the entire interior of the fitting within the flanges, and that portion of the lining adjacent the flanges is threaded in continuation of the internal threads formed in the flanges.

Figure 2:
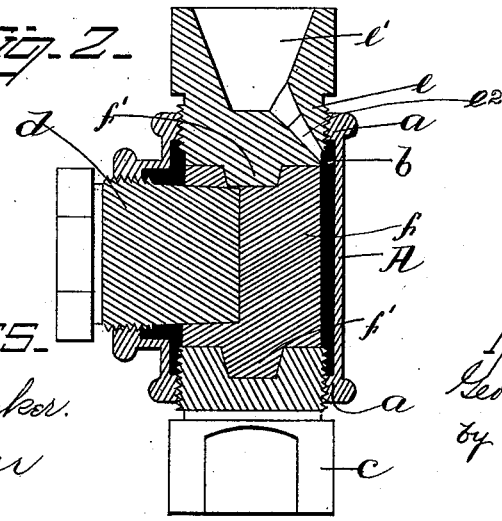

Figure 1 shows in vertical section an apparatus or mold for casting or forming linings upon the interior of a pipe fitting, the invention being herein illustrated as applied to a T-fitting; Fig. 2, a modification to be referred to.

The T-fitting shown as A has inwardly extended flanges or ribs $a$ at each opening, they being interiorly screw threaded, and adjacent to said flanges an annular recess $b$ is formed, being of somewhat greater diameter than the central portion of the fitting, but so far as some of the features of my present invention are concerned, the central portion of the fitting may be of the same internal diameter from flange to flange, the annular recesses $b$ not being provided. An externally screw threaded plug $c$ is screwed into one of the openings, its threaded portion projecting inward beyond the flange $a$, and the inner end of said plug is tapered off as at $c'$, for purposes to be hereinafter described, yet the inner ends of said plugs may be made flat if desired. A similar externally screw threaded plug $d$ is screwed into another one of the openings, and another externally screw threaded plug $e$ is screwed into the third opening, said plugs $d$ and $e$ likewise projecting inward beyond the flanges $a, a$, and said plug $e$ has formed in it a recess $e'$ from the bottom of which leads a diagonal passage $e^2$, terminating at or near the inner end of the plug, and as the molten metal to be used in forming the lining is introduced through the passage $e'$, $e^2$, the plug $e$ is herein designated as the "pouring" plug.

Contained within the central portion of the fitting is a cylindrical core $f$, abutting at each end against the inner ends of the screw plugs $c$ and $e$, and projections and recesses are formed upon the contiguous faces of said parts, as for instance, there may be a projection $f'$ upon the inner end of the plug $e$, which will enter a recess in the end of the core $f$, and a like projection $f'$ upon the opposite end of the core $f$ which will enter a recess in the plug $c$, the core $f$ being thereby securely held in place. The core $f$ is made smaller in diameter than the internal diameter of the fitting, so that an annular space is left around it, in which the lining is formed. Another core $g$ is dropped into a circular recess formed in the side of the core $f$, it being herein represented as formed integral with the screw plug $d$.

In placing the parts of the mold together the screw plug $c$ may be first screwed into the fitting, then the core $f$ placed in position thereon, and then the screw plug $e$ inserted, then the core $g$ with its integrally formed screw plug $d$ inserted, and the several parts are then tightened by turning the several screw plugs. The molten metal is then introduced through the passage in the pouring plug $e$, it filling the space around the cores $f$ and $g$, and also around the inner projecting threaded ends of the screw plugs $c$, $d$, and $e$, and after it has become cool, the said screw plugs and cores are removed, and the entire interior of the fitting will be lined betwen or within the flanges, and if the screw plugs are formed with tapering end portions $c'$, as shown in Fig. 1, seats will be formed in the lining against which the inner end of the pipes or fittings to which the lined fitting may be connected, may abut.

While my invention is herein shown as applied to a T-fitting, I desire it to be understood that it may be applied to any other form of fitting, as a union, elbow, or coupling, as many screw plugs being used as there are openings, or as may be desired, and as many core pieces being used as may be necessary, although with some forms of fittings said core pieces may be omitted, or formed integral with the screw plugs.

Referring to Fig. 2, the fitting is formed of the same internal diameter between the flanges, and the ends of the screw plugs made flat, and when the parts are so formed, the lining will be devoid of seats.

I claim—

1. A pipe fitting having an inwardly extended screw threaded flange, combined with an externally screw threaded plug, having a pouring passage through it screwed into said fitting, its threaded portion projecting inward beyond the flange, and forming a screw threaded mold around which the molten metal is poured, to thereby form a screw threaded lining in continuation of the screw threads upon the flange of the fitting, substantially as described.

2. A pipe fitting having an inwardly extended screw threaded flange, combined with an externally screw threaded plug, screwed into said fitting, its threaded portion projecting inward beyond the flange, and another plug inserted at the opposite end of the fitting, one of said plugs having a pouring passage through it substantially as described.

3. A pipe fitting having an inwardly extended screw threaded flange at each end, combined with externally screw threaded plugs with tapering ends, screwed into said fitting, the threaded portions of said plugs projecting inward beyond the flanges, one of said plugs having a pouring passage through it, and a core interposed between said plugs of substantially the same diameter as the reduced inner faces of the plugs, substantially as described.

4. A pipe fitting having at one end a single inwardly extended screw threaded flange, combined with a screw threaded plug screwed thereinto, its screw threaded portion projecting inward, beyond the flange, a contiguous core of smaller diameter than the internal diameter of the fitting, and a plug inserted at the opposite end of the fitting, one of said plugs having a pouring passage through it, substantially as described.

5. A pipe fitting having at each end a single inwardly extended screw threaded flange, combined with externally screw threaded plugs screwed into said fitting, the inner screw threaded ends thereof projecting inward beyond the flanges, a core of smaller diameter than the internal diameter of the fitting, and a pouring passage communicating with the annular space around the parts introduced into the fitting, and between the flanges thereof, substantially as described.

6. A pipe fitting having three openings with inwardly projecting screw threaded flanges, combined with three screw plugs adapted to be screwed thereinto, the inner ends thereof projecting inwardly beyond the flanges, one of said plugs having a passage through it, and core pieces of smaller diameter than the internal diameter of the fitting interposed between and contiguous to said plugs, substantially as described.

7. A pipe fitting having three screw threaded openings, combined with three screw plugs adapted to be screwed thereinto, one of said plugs having a passage through it, and having core pieces of smaller diameter than the internal diameter of the fitting interposed between and held in position by said plugs, substantially as described.

In testimony whereof I have signed my name to this specification in the presence of two subscribing witnesses.

GEORGE W. HARRINGTON.

Witnesses:
 EDW. C. STORROW,
 B. J. NOYES.